United States Patent [19]

Beck et al.

[11] Patent Number: 5,304,363

[45] Date of Patent: * Apr. 19, 1994

[54] POROUS MATERIALS

[75] Inventors: Jeffrey S. Beck, Lawrenceville, N.J.; Charles T. Kresge, West Chester; Sharon B. McCullen, Newtown, both of Pa.; Wieslaw J. Roth, Sewell, N.J.; James C. Vartuli, West Chester, Pa.

[73] Assignee: Mobil Oil Corp., Fairfax, Va.

[*] Notice: The portion of the term of this patent subsequent to Apr. 17, 2009 has been disclaimed.

[21] Appl. No.: 907,941

[22] Filed: Jul. 2, 1992

Related U.S. Application Data

[63] Continuation-in-part of Ser. No. 735,000, Jul. 24, 1991, abandoned, which is a continuation-in-part of Ser. No. 625,245, Dec. 10, 1990, Pat. No. 5,098,684, which is a continuation-in-part of Ser. No. 470,008, Jan. 25, 1990, Pat. No. 5,102,643.

[51] Int. Cl.$^5$ ............................................. C01B 33/26
[52] U.S. Cl. .................... 423/328.1; 423/705; 423/718; 502/64
[58] Field of Search .................... 423/718; 502/60, 64, 502/77, 241, 242

[56] References Cited

U.S. PATENT DOCUMENTS

| | | | |
|---|---|---|---|
| 4,762,010 | 8/1988 | Borghard et al. | 73/865.5 |
| 4,859,648 | 8/1989 | Landis et al. | 502/242 |
| 5,057,296 | 10/1991 | Beck | 423/277 |
| 5,098,684 | 3/1992 | Kresge et al. | 423/277 |
| 5,102,643 | 4/1992 | Kresge et al. | 423/328 |
| 5,110,572 | 5/1992 | Calabro et al. | 423/328 |
| 5,145,816 | 9/1992 | Beck et al. | 502/60 |
| 5,156,829 | 10/1992 | McCullen et al. | 502/60 |

FOREIGN PATENT DOCUMENTS 756744 6/1975 South Africa.

Primary Examiner—Anthony McFarlane
Attorney, Agent, or Firm—Alexander J. McKillop; Dennis P. Santini; Edward F. Kenehan, Jr.

[57] ABSTRACT

There is provided a porous material. A process for preparing this material involves adding an amphiphilic compound to the reaction mixture for preparing a crystalline oxide. The amphiphilic compound may be a quaternary ammonium cationic surfactant. These surfactants may be in the form of lamellar liquid crystals, and may function as templates for the formation of the present mesoporous oxide materials.

16 Claims, No Drawings

POROUS MATERIALS

CROSS-REFERENCE TO RELATED APPLICATIONS

This application is a continuation-in-part of application Ser. No. 07/735,000, filed on Jul. 24, 1991, now abandoned, which is a continuation-in part of application Ser. No. 07/625,245, filed Dec. 10, 1990, now U.S. Pat. No. 5,098,684, which is a continuation-in part of application Ser. No. 07/470,008, filed Jan. 25, 1990, now U.S. Pat. No. 5,102,643. The entire disclosures of these applications are expressly incorporated herein by reference.

BACKGROUND

There are provided particular porous materials.

LIQUID CRYSTALS, AMPHIPHILES, MICELLES, LYOTROPIC PHASES

Amphiphilic compounds, also referred to as amphiphiles, surface-active agents or surfactants, are composed of molecules which contain both at least one polar or hydrophilic "head" group and at least one non-polar or hydrophobic "tail". In aqueous solution, amphiphilic compounds may associate with each other to form structures known as micelles. These micelles are most often spherical structures in which the polar head groups form the outer surface and the non-polar tails form the inner portion or core of the sphere. Micelles are stable colloidal aggregates which are formed by amphiphiles above a specific concentration, which is called the critical micelle concentration or "CMC". Amphiphiles often have the further ability to arrange into various other, energetically favorable, ordered structures (e.g., liquid crystalline phases) in solution in response to certain stimuli. These stimuli include concentration of the amphiphile, temperature, pressure, ionic composition of solution, presence of organic or inorganic species in solution, etc.

The head group of an amphiphile may bear a positive or negative charge. Anionic amphiphilic compounds have a hydrophilic head group which bears a negative charge; a typical anionic amphiphilic compound is $R-O-SO_3-$, in which R represents a hydrocarbon chain, the hydrophobic "tail" group. The negative charge associated with the anionic head group is usually balanced by a small cation, such as $H+$, $Na+$, $K+$ or $NH_4+$. Cationic amphiphilic compounds have a hydrophilic head group which bears a positive charge; a typical cationic amphiphilic compound is $R(CH_3)_3N+$ where R again represents a hydrocarbon chain (the tail group). The positive charge associated with the cationic head group is usually balanced by a small anion, such as $OH-$, $Cl-$, $Br-$ or $SO_4=$. The length of the chain (R) is critical to the function of an amphiphilic species, as, in aqueous solution, hydrocarbon chain lengths below 6 carbons do not energetically favor aggregation to form micellar phases, and carbon chain lengths above 36 carbons do not exhibit sufficient solubility to achieve CMC status. There exist other amphiphilic compounds, some bearing no net charge, that produce liquid crystal phases in solution. These include the general classes of nonionic and zwitterionic surfactants. An exhaustive review of this chemistry is found in a review article by Winsor, *Chemical Reviews*, 68, 1, (1968).

Liquid crystals are materials which exhibit aspects of both the crystalline solid and amorphous liquid state. They resemble liquids in their ability to flow, and solids in the degree of order within their structure. In many systems, this order is established spontaneously. In other cases, it can be brought about, or controlled, by electric, magnetic, or hydrodynamic fields. Lyotropic liquid crystals comprise a large body of known liquid crystalline systems. These lyotropic systems are often comprised of two components: a solvent (e.g., water) and an amphiphilic compound. In many cases, however, additional components such as salts or other inorganic or organic compounds may be present in a lyotropic system. Such solvent-containing systems are often referred to as solutions, although it will be understood that such solutions are not true molecular solutions insofar as amphiphilic compounds are present as micellar aggregates as opposed to individual molecular species.

HEXAGONAL, CUBIC AND LAMELLAR PHASES

Liquid crystal/micellar aggregates may exhibit various structures. For example, three well known phases of lyotropic liquid crytals are the hexagonal, cubic and lamellar phases. The presence of these phases in a micellar solution containing amphiphilic compounds will be determined by a large number of factors including the concentration of the amphiphile, the presence of ions, other organic or inorganic molecules, temperature, etc. The existence of such phases in micellar solutions containing amphiphilic species are determined by a variety of techniques including, for example, X-ray diffraction techniques. X-ray diffraction and other studies of the hexagonal phase provide evidence that the amphiphilic species contained therein are arranged into rodlike micelles, or clusters, of indefinite length, and that these rods are stacked in a hexagonal array, e.g., each rod is surrounded by six nearest neighbors. Thus, liquid crystalline medium may be fashioned so as to contain the amphiphilic species packed in a hexagonal array.

Lamellar liquid crystalline phases are distinctly different from hexagonal phases in that the amphiphilic molecules do not form hexagonally packed rods. An example of a lamellar liquid crystalline phase may be thought of in terms of sheets composed of bilayers of amphiphilic molecules separated from each other by intervening water layers. The amphiphilic molecules within each lamella may be oriented perpendicular to the plane of the lamella, or tilted. For comparable surfactants, lamellar phases are usually found at higher surfactant concentration than are hexagonal phases.

Another liquid crystalline phase is the cubic phase. Such phases are sometimes formed at concentrations of amphiphile intermediate between those producing the lamellar phase and the hexagonal phase. Optical observations of the cubic phases only reveal that the structure is isotropic. X-ray diffraction studies have shown that these structures may be characterized as face-centered or body-centered cubic, although the detailed structure remains uncertain. It has often been argued, however, that these structures are bicontinuous. A particular type of cubic phase observed for liquid crystalline phases is known as Ia3d.

MICELLAR SOLUBILIZATION

Liquid crystal systems, in certain of their phases, exhibit properties which may be probed by various experimental means. For example, amphiphilic species which aggregate as micelles exhibit an important property known as micellar solubilization. The ability of micelles to solubilize non-polar organic species and thus "swell" to larger proportions is critically important to an amphiphilic species' role in common detergent formulations. This ability is discussed in detail in the aforementioned review article by Winsor.

SURFACTANT CHAIN LENGTH

A factor concerning the ability of amphiphilic compounds to form micelles is the "Critical Micelle Concentration" or "CMC". The CMC is a measure of the aqueous concentration of surfactant at which micelles first begin to appear. A very extensive tabulation of CMC data has been compiled by Mukerjee and Mysels, "Critical Micelle Concentrations of Aqueous Surfactant Systems", National Standard Data Reference Service, NSDR 50-NBS 36, National Bureau of Standards, USA. Typical CMC's of alkyltrimethylammonium bromide salts range from $10^{-1}$M to $10^{-2}$M for $C_6$, $C_8$ salts, to $10^{-4}$M for $C_{16}$ salts.

It is well known in the surfactant literature that the diameter of micelles is, among other factors, controlled by the chain length of the amphiphilic species from which they are formed.

SOLID CRYSTALLINE OXIDES

Zeolites, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. The pore systems of other zeolites lack cavities, and these systems consist essentially of undimensional channels which extend throughout the crystal lattice. Since the dimensions of zeolite pores are such as to accept for adsorption molecules of certain dimensions while rejecting those of larger dimensions, these materials are known as "molecular sieves" and are utilized in a variety of ways to take advantage of these properties.

Such molecular sieves, both natural and synthetic, include a wide variety of positive ion-containing crystalline silicates. These silicates can be described as a rigid three-dimensional framework of $SiO_4$ and, optionally, Periodic Table Group IIIB element oxide, e.g. $AlO_4$, in which the tetrahedra are cross-linked by the sharing of oxygen atoms whereby the ratio of the total Group IIIB element, e.g. aluminum, and Group IVB element, e.g. silicon, atoms to oxygen atoms is 1:2. The electrovalence of the tetrahedra containing the Group IIIB element, e.g. aluminum, is balanced by the inclusion in the crystal of a cation, for example, an alkali metal or an alkaline earth metal cation. This can be expressed wherein the ratio of the Group IIIB element, e.g. aluminum, to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

Prior art techniques have resulted in the formation of a great variety of synthetic zeolites. Many of these zeolites have come to be designated by letter or other convenient symbols, as illustrated by zeolite A (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11 (U.S. Pat. No. 3,709,979); zeolite ZSM-12 (U.S. Pat. No. 3,832,449); zeolite ZSM-20 (U.S. Pat. No. 3,972,983); ZSM-35 (U.S. Pat. No. 4,016,245); and zeolite ZSM-23 (U.S. Pat. No. 4,076,842), merely to name a few.

The $SiO_2/Al_2O_3$ ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to the limits of present analytical measurement techniques. U.S. Pat. No. 3,941,871 (Re. 29,948) discloses a porous crystalline silicate made from a reaction mixture containing no deliberately added alumina in the recipe and exhibiting the X-ray diffraction pattern characteristic of ZSM-5. U.S. Pat. Nos. 4,061,724; 4,073,865 and 4,104,294 describe crystalline silicates of varying alumina and metal content.

Aluminum phosphates are taught in U.S. Pat. Nos. 4,310,440 and 4,385,994, for example. These aluminum phosphate materials have essentially electroneutral lattices. These lattices may be described in terms of alternating $AlO_4$ and $PO_4$ tetrahedra. An example of such an aluminum phosphate is a material designated as $AlPO_4$-5.

Details of the structure of $AlPO_4$-5 are given by Meier and Olson in *Atlas of Zeolite Structure Types*, 2nd rev. ed. (1987), published on behalf of the Structure Commission of the International Zeolite Association by Butterworths. More particularly, Meier and Olson indicate that $AlPO_4$-5, also designated as AFI, is a material having pore windows formed by 12 tetrahedral members, these windows being about 7.3 Angstroms in diameter.

Of the siliceous zeolites discussed hereinabove, zeolites X and Y have the largest pore diameter and overall pore volume. Zeolites X and Y are synthetic analogues of the naturally occurring zeolite, faujasite. Details of the structure of faujasite are also given by Meier and Olson, ibid. More particularly, Meier and Olson indicate that faujasite, also designated as FAU, is a material having pore windows formed by 12 tetrahedral members, these windows being about 7.4 Angstroms in diameter. For the purposes of the present disclosure, the terms, siliceous zeolite and siliceous oxide, are defined as materials wherein at least 50 mole percent of the oxides thereof, as determined by elemental analysis, are silica. The pore volume of faujasite is believed to be about 0.26 cc/g.

An oxide material with even larger pores than faujasite and $AlPO_4$-5 is a material designated as VPI-5. The structure of VPI-5 is described by Davis et al in an article entitled, "VPI-5: The first molecular sieve with pores larger than 10 Angstroms", *Zeolites*, Vol. 8, pp. 362-366 (1988). As indicated by Davies et al, VPI-5 has pore windows formed by 18 tetrahedral members of about 12-13 Angstroms in diameter. A material having the same structure as VPI-5 is designated MCM-9 and is described in U.S. Pat. No. 4,880,611.

A naturally occurring, highly hydrated basic ferric oxyphosphate mineral, cacoxenite, is reported by Moore and Shen, *Nature*, Vol. 306, No. 5941, pp. 356-358 (1983) to have a framework structure containing very large channels with a calculated free pore diameter of 14.2 Angstroms. R. Szostak et al., *Zeolites: Facts, Figures, Future*, Elsevier Science Publishers B.V. (1989), present work showing cacoxenite as being very hydrophilic, i.e. adsorbing non-polar hydrocarbons only with great difficulty. Their work also shows that thermal treatment of cacoxenite causes an overall decline in X-ray peak intensity.

In layered materials, the interatomic bonding in two directions of the crystalline lattice is substantially different from that in the third direction, resulting in a structure that contains cohesive units resembling sheets. Usually, the bonding between the atoms within these sheets is highly covalent, while adjacent layers are held together by ionic forces or van der Waals interactions. These latter forces can frequently be neutralized by relatively modest chemical means, while the bonding between atoms within the layers remains intact and unaffected.

Certain layered materials, which contain layers capable of being spaced apart with a swelling agent, may be pillared to provide materials having a large degree of porosity. Examples of such layered materials include clays. Such clays may be swollen with water, whereby the layers of the clay are spaced apart by water molecules. Other layered materials are not swellable with water, but may be swollen with certain organic swelling agents such as amines and quaternary ammonium compounds. Examples of such non-water swellable layered materials are described in U.S. Pat. No. 4,859,648 and include trititanates, perovskites and layered silicates, such as magadiite and kenyaite. Another example of a non-water swellable layered material, which can be swollen with certain organic swelling agents, is a vacancy-containing titanometallate material, as described in U.S. Pat. No. 4,831,006.

Once a layered material is swollen, the material may be pillared by interposing a thermally stable substance, such as silica, between the spaced apart layers. The aforementioned U.S. Pat. Nos. 4,831,006 and 4,859,648 describe methods for pillaring the non-water swellable layered materials described therein and are incorporated herein by reference for definition of pillaring and pillared materials.

Other patents teaching pillaring of layered materials and the pillared products include U.S. Pat. Nos. 4,216,188; 4,248,739; 4,176,090 and 4,367,163; and European Patent Application 205,711.

TEMPLATING

In an article by Lok et al., entitled "The Role of Organic Molecules in Molecular Sieve Synthesis", appearing in *Zeolites*, Vol. 3, pp. 282-291 (1983), the so-called "templating theory" of molecular sieve synthesis is discussed. According to this theory, individual organic molecular species, such as individual quaternary ammonium ions, may serve as templates about which portions of channels or cages of molecular sieves may form. Although organic molecules would also appear to direct or help the synthesis of certain molecular sieves, such as zeolites and crystalline aluminum phosphates, by influencing the gel chemistry of the reaction mixture, the structures of a number of molecular sieves are consistent with structures derived from reaction mixtures where individual quaternary ammonium ions serve as templates for framework formation.

In most instances, the quaternary ammonium compounds used to synthesize zeolitic molecular sieves do not contain the appropriate features to function as amphiphilic species. Typically, the chain length (R), the "tail" group, is less than six carbons. Therefore, liquid crystal chemistry is not favored in typical zeolite syntheses.

SUMMARY

There is provided a composition of matter comprising an inorganic, porous material exhibiting, after calcination, an X-ray diffraction pattern according to Table 1 with no peaks at positions less than about 10 Angstroms d-spacing with relative intensity greater than 20% of the strongest peak. There is also provided a process for preparing the above-mentioned composition of matter, said process comprising the steps of:

(a) preparing a reaction mixture having a composition in terms of mole ratios, within the following ranges:

| | | |
|---|---|---|
| $X_2O_3/YO_2$ | = | 0 to 0.5 |
| $X_2O_3/(YO_2 + Z_2O_5)$ | = | 0.1 to 100 |
| $X_2O_3/(YO_2 + WO + Z_2O_5)$ | = | 0.1 to 100 |
| $R_2'O/(X_2O_3 + YO_2 + WO + Z_2O_5)$ | = | 0.3 to 2.0 |
| Solvent/$(X_2O_3 + YO_2 + WO + Z_2O_5)$ | = | 1 to 1500 | wherein W is one or more divalent elements; X is one or more trivalent elements; Y is one or more tetravalent elements; Z is one or more pentavalent elements; R comprises an organic agent having the formula $R_1R_2R_3R_4Q^+$, wherein Q is nitrogen or phosphorus, and at least one of $R_1$, $R_2$, $R_3$, $R_4$ is an aryl or alkyl group having 6 to 36 carbon atoms and each of the remainder of $R_1$, $R_2$, $R_3$, and $R_4$ is selected from hydrogen and an alkyl group having 1 to 5 carbon atoms; and wherein the solvent is a $C_1$ to $C_6$ alcohol or diol, or water;

(b) maintaining said mixture under sufficient conditions for formation of an inorganic oxide containing residual organic compound;

(c) recovering said inorganic oxide containing residual organic compound from step (b);

(d) treating said inorganic oxide of step (c) with a compound of the formula $$M'X'_2Y'_m$$

where M' is boron, aluminum, silicon or titanium; X' represents alkyl halides having from 1-6 carbon atoms and/or alkoxides having 1-6 carbon atoms; Y' represents X' and/or alkyls with 1-12 carbon atoms; and m=1-2; and (e) calcining said material from step (d) under conditions sufficient to remove residual organic compounds.

EMBODIMENTS

The inorganic, oxide material described herein may have the following composition:

$$M_{n/q}(W_aX_bY_cZ_dO_h)$$ 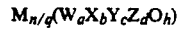

wherein W is a divalent element, such as a divalent first row transition metal, e.g. manganese, cobalt and iron, and/or magnesium, preferably cobalt; X is a trivalent element, such as aluminum, boron, iron and/or gallium, preferably aluminum; Y is a tetravalent element such as titanium, silicon and/or germanium, preferably silicon; Z is a pentavalent element, such as phosphorus; M is one or more ions, such as, for example, ammonium, Group IA, IIA and VIIB ions, usually hydrogen, sodium, potassium and/or fluoride ions; n is the charge of the composition excluding M expressed as oxides; q is the weighted molar average valence of M; n/q is the number of moles or mole fraction of M; a, b, c, and d are mole fractions of W, X, Y and Z, respectively; h is a number of from 1 to 2.5; and (a+b+c+d)=1.

A preferred embodiment of the above oxide material is when (a+b+c) is greater than d, and h=2. A further embodiment is when a and d=0, and h=2.

In the as-synthesized form, this material may have a composition, on an anhydrous basis, expressed empirically as follows:

$$rRM_{n/q}(W_aX_bY_cZ_dO_h)$$

wherein R is the total organic material not included in M as an ion, and r is the coefficient for R, i.e. the number of moles or mole fraction of R.

The M and R components are associated with the material as a result of their presence during crystallization, and are easily removed or, in the case of M, replaced by post-crystallization methods hereinafter more particularly described.

To the extent desired, the original M, e.g., sodium, potassium or chloride, ions of the as-synthesized material described herein can be replaced in accordance with techniques well known in the art, at least in part, by ion exchange with other ions. Examples of such replacing ions include metal ions, hydrogen ions, hydrogen precursor, e.g. ammonium, ions and mixtures thereof. Particular examples of such ions are those which tailor the catalytic activity for certain hydrocarbon conversion reactions. Replacing ions include hydrogen, rare earth metals and metals of Groups IA (e.g. K), IIA (e.g. Ca), VIIA (e.g. Mn), VIIIA (e.g. Ni), IB (e.g. Cu), IIB (e.g. Zn), IIIB (e.g. In), IVB (e.g. Sn), and VIIB (e.g. F) of the Periodic Table of the Elements (Sargent-Welch Scientific Co. Cat. No. S-18806, 1979) and mixtures thereof.

Oxide materials described herein may be readily identified as crystalline materials. The term "crystalline" is meant herein as having sufficient order to produce at least one peak in a diffraction pattern from electromagnetic radiation or particle beams. These crystalline materials may have a diffraction pattern produced, for example, by X-ray, electron or neutron diffraction. These crystalline materials, especially after stabilization treatment as discussed hereinafter, may have sufficient thermal stability to retain the crystallinity thereof after being subjected to calcination conditions to remove organic material retained from the as-synthesized forms thereof.

These mesoporous materials may have an X-ray diffraction pattern with 2 or more peaks. For example, X-ray patterns of these layered materials may have the values given in Table 1.

TABLE 1

| d-spacing Angstroms | $d_n/d_1$ | Relative Intensity |
|---|---|---|
| $d_1 \geq \sim 18$ | 1.0 | 100 |
| $d_2$ | 0.50 ± 0.06 | W |

X-ray patterns of this mesoporous material having 3 or more peaks may have the values given in Table 2.

TABLE 2

| d-spacing Angstroms | $d_n/d_1$ | Relative Intensity |
|---|---|---|
| $d_1 \geq \sim 18$ | 1.0 | 100 |
| $d_2$ | 0.50 ± 0.06 | W |
| $d_3$ | 0.33 ± 0.06 | W |

X-ray patterns of this mesoporous material having 4 or more peaks may have the values given in Table 3.

TABLE 3

| d-spacing Angstroms | $d_n/d_1$ | Relative Intensity |
|---|---|---|
| $d_1 \geq \sim 18$ | 1.0 | 100 |
| $d_2$ | 0.50 ± 0.06 | W |
| $d_3$ | 0.33 ± 0.06 | W |
| $d_4$ | 0.25 ± 0.06 | W |

Peaks not shown in the above-mentioned Tables 1-3 may be totally lacking from the present materials.

The as-synthesized form of the mesoporous material, prepared by the present process, is generally not stable under conditions, e.g., calcination conditions, sufficient to remove organic material retained from the synthesis mixture. One possible explanation for this instability is that the as-synthesized form of this mesoporous material is a layered material including swelling agent in between the layers thereof, perhaps in the form of micelles, which serves to space the layers apart from one another. When residual surfactant is removed from the as-synthesized form of such a layered material, the oxide layers may collapse upon one another to yield a dense material. Another explanation for the instability of the present material is that this material is a channel structure with weak walls. By treating the material under conditions sufficient to strengthen the walls, stability could be imparted to the material.

It has been discovered that the as-synthesized form of the mesoporous material may be stabilized by treatments for pillaring swollen layered materials as disclosed in U.S. Pat. No. 4,859,648, the entire disclosure of which is expressly incorporated herein by reference. This mesoporous material may also be stabilized by treatments disclosed in the U.S. application Ser. No. 07/718,505, filed Jun. 20, 1991, now U.S. Pat. No. 5,156,824 the entire disclosure of which is expressly incorporated herein by reference.

This stabilization treatment involves contacting the material with a compound of the formula $$M'X'_2Y'_m$$

where M' is boron, aluminum, silicon or titanium; X' represents alkyl halides having from 1-6 carbon atoms and/or alkoxides having 1-6 carbon atoms; Y' represents X' and/or alkyls with 1-12 carbon atoms; and m=1-2. Examples of compounds of the formula $M'X'_2Y'_m$ are tetraethylorthosilicate, tetramethylorthosilicate, titanium tetraethoxide, aluminum tri-sec-butoxide and aluminum tri-iso-butoxide. The treatment mixture containing crystalline material and $M'X'_2Y'_m$ may also include solvents as are known in the art, preferably organic solvents such as alcohols and diols having 1 to 6 carbon atoms ($C_{1-6}$). The ratio of crystalline material to treatment compound may vary within wide limits, e.g., from about 1:100 to about 100:1. The temperature at which the treatment method may be carried out is limited, as a practical matter, only by the freezing or boiling point (including the boiling point under pressure) of the treatment mixture, and the time of contacting is not critical and may be, for example, from about 1 to about 24 hours, preferably from about 1 to about 12 hours. After treatment, the treated product is preferably calcined, preferably in the presence of oxygen, under conditions sufficient to convert the compound to an oxide of M'.

The equilibrium benzene adsorption capacity of this material is measured on the basis of no pore blockage by incidental contaminants. For instance, the sorption test will be conducted on the crystalline material phase having any pore blockage contaminants and water removed by ordinary methods. Water may be removed by dehydration techniques, e.g. thermal treatment. Pore blocking inorganic amorphous materials, e.g. silica, and organics may be removed by contact with acid or base or other chemical agents such that the detrital material will be removed without detrimental effect on the crystal described herein.

In certain Examples which follow, X-ray diffraction data were collected on a Scintag PAD X automated diffraction system employing theta-theta geometry, Cu K-alpha radiation, and an energy dispersive X-ray detector. Use of the energy dispersive X-ray detector eliminated the need for incident or diffracted beam monochromators. Both the incident and diffracted X-ray beams were collimated by double slit incident and diffracted collimation systems. The slit sizes used, starting from the X-ray tube source, were 0.5, 1.0, 0.3 and 0.2 mm, respectively. Different slit systems may produce differing intensities for the peaks. The mesoporous materials described herein that have the largest pore sizes may require more highly collimated incident X-ray beams in order to resolve the low angle peak from the transmitted incident X-ray beam.

The diffraction data were recorded by step-scanning no faster than at 0.04 degrees of two-theta, where theta is the Bragg angle, and a counting time of 10 seconds for each step. The interplanar spacings, d's, were calculated in Angstrom units (A), and the relative intensities of the lines, $I/I_o$, where $I_o$ is one-hundredth of the intensity of the strongest line, above background, were derived with the use of a profile fitting routine. The intensities were uncorrected for Lorentz and polarization effects. The relative intensities are given in terms of the symbols vs=very strong (75–100), s=strong (50–74), m=medium (25–49) and w=weak (0–24). It should be understood that diffraction data listed as single lines may consist of multiple overlapping lines which under certain conditions, such as very high experimental resolution or crystallographic changes, may appear as resolved or partially resolved lines. Typically, crystallographic changes can include minor changes in unit cell parameters and/or a change in crystal symmetry, without a substantial change in structure. These minor effects, including changes in relative intensities, can also occur as a result of differences in cation content, framework composition, nature and degree of pore filling, thermal and/or hydrothermal history, and peak width/shape variations due to particle size/shape effects, structural disorder or other factors known to those skilled in the art of X-ray diffraction.

The equilibrium benzene adsorption capacity may be determined by contacting the stabilized crystalline material described herein, after dehydration or calcination at, for example, about 540° C. for at least about one hour and other treatment, if necessary, in an attempt to remove any pore blocking contaminants, at 25° C. and 50 torr benzene until equilibrium is reached. The weight of benzene sorbed is then determined as more particularly described hereinafter.

The following description provides examples of how physisorption measurements, particularly argon physisorption measurements, may be taken. Examples 22(a) and 22(b) of the aforementioned U.S. Pat. No. 5,098,684, provide demonstrations of these measurements as applied to particular samples.

To determine the pore diameters of products with pores up to about 60 Angstroms in diameter, 0.2 gram samples of the products may be placed in glass sample tubes and attached to a physisorption apparatus as described in U.S. Pat. No. 4,762,010, which is incorporated herein by reference.

The samples may be heated to 300° C. for 3 hours in vacuo to remove adsorbed water. Thereafter, the samples may be cooled to 87° K. by immersion of the sample tubes in liquid argon. Metered amounts of gaseous argon may then be admitted to the samples in stepwise manner as described in U.S. Pat. No. 4,762,010, column 20. From the amount of argon admitted to the samples and the amount of argon left in the gas space above the samples, the amount of argon adsorbed can be calculated. For this calculation, the ideal gas law and the calibrated sample volumes may be used. (See also S. J. Gregg et al., *Adsorption, Surface Area and Porosity*, 2nd ed., Academic Press, (1982)). In each instance, a graph of the amount adsorbed versus the relative pressure above the sample, at equilibrium, constitutes the adsorption isotherm. It is common to use relative pressures which are obtained by forming the ratio of the equilibrium pressure and the vapor pressure $P_o$ of the adsorbate at the temperature where the isotherm is measured. Sufficiently small amounts of argon may be admitted in each step to generate, e.g., 168 data points in the relative pressure range from 0 to 0.6. At least about 100 points are required to define the isotherm with sufficient detail.

The step (inflection) in the isotherm indicates filling of a pore system. The size of the step indicates the amount adsorbed, whereas the position of the step in terms of $P/P_o$ reflects the size of the pores in which the adsorption takes place. Larger pores are filled at higher $P/P_o$. In order to better locate the position of the step in the isotherm, the derivative with respect to log $(P/P_o)$ is formed. The position of an adsorption peak in terms of log $(P/P_o)$ may be converted to the physical pore diameter in Angstroms by using the following formula:

$$\log(P/P_o) = \frac{K}{d - 0.38}\left(\frac{S^4}{3(L - D/2)^3} - \frac{S^{10}}{9(L - D/2)^9} - \frac{S^4}{3(D/2)^3} + \frac{S^{10}}{9(D/2)^9}\right)$$

wherein d=pore diameter in nanometers, K=32.17, S=0.2446, L=d+0.19, and D=0.57.

This formula is derived from the method of Horvath and Kawazoe (G. Horvath et al., *J. Chem. Eng. Japan*, 16 (6) 470(1983)). The constants required for the implementation of this formula were determined from a measured isotherm of AlPO$_4$-5 and its known pore size. This method is particularly useful for porous materials having pores of up to about 60 Angstroms in diameter.

For materials having a pore size greater than 9 Angstroms, the plot of log $(P/P_o)$ vs. the derivative of uptake may reveal more than one peak. More particularly, a peak may be observed at $P/P_o=0.0027$. This peak reflects adsorption on the walls of the pores and is not otherwise indicative of the size of the pores of a given material.

A material with pore size of 39.6 Angstroms has a peak occurring at log $(P/P_o)=-0.4$ or $P/P_o=0.4$. A value of $P/P_o$ of 0.03 corresponds to 13 Angstroms pore size.

The above method of Horvath and Kawazoe for determining pore size from physisorption isotherms was intended to be applied to pore systems of up to 20 Angstroms diameter; but with some care as above detailed, its use can be extended to pores of up to 60 Angstroms diameter, as described above.

In the pore regime above 60 Angstroms diameter, however, the Kelvin equation can be applied. It is usually given as:

$$\ln(P/P_o) = \frac{-2\lambda V}{r_k RT} \cos \theta$$

where:
$\lambda$=surface tension of sorbate
V=molar volume of sorbate
$\Theta$=contact angle (usually taken for practical reasons to be 0)
R=gas constant
T=absolute temperature
$r_k$=capillary condensate (pore) radius
$P/P_o$=relative pressure (taken from the physisorption isotherm)

The Kelvin equation treats adsorption in pore systems as a capillary condensation phenomenon and relates the pressure at which adsorption takes place to the pore diameter through the surface tension and contact angle of the adsorbate (in this case, argon). The principles upon which the Kelvin equation are based are valid for pores in the size range 50 to 1000 Angstroms diameter. Below this range the equation no longer reflects physical reality, since true capillary condensation cannot occur in smaller pores; above this range the logarithmic nature of the equation precludes obtaining sufficient accuracy for pore size determination.

The particular implementation of the Kelvin equation often chosen for measurement of pore size is that reported by Dollimore and Heal (D. Dollimore and G. R. Heal, *J. Applied Chem*, 14, 108 (1964)). This method corrects for the effects of the surface layer of adsorbate on the pore wall, of which the Kelvin equation proper does not take account, and thus provides a more accurate measurement of pore diameter. While the method of Dollimore and Heal was derived for use on desorption isotherms, it can be applied equally well to adsorption isotherms by simply inverting the data set.

When used as a catalyst component, the crystalline material described herein should be subjected to treatment to remove part or all of any organic constituent. The present composition can also be used as a catalyst component (e.g., a support) in intimate combination with a hydrogenating component such as a metal, particularly a transition metal, especially tungsten, vanadium, molybdenum, rhenium, nickel, cobalt, chromium, manganese, or a noble metal such as platinum or palladium or mixtures thereof where a hydrogenation-dehydrogenation function is to be performed. Such component can be in the composition by way of co-crystallization, exchanged into the composition to the extent a Group IIIB element, e.g. aluminum, is in the structure, impregnated therein or intimately physically admixed therewith. Such component can be impregnated in or on to it such as, for example, by, in the case of platinum, treating the material with a solution containing a platinum metal-containing ion. Thus, suitable platinum compounds for this purpose include chloroplatinic acid, platinous chloride and various compounds containing the platinum amine complex.

The above crystalline material, especially in its metal, hydrogen and ammonium forms can be beneficially converted to another form by thermal treatment (calcination). This thermal treatment is generally performed by heating one of these forms at a temperature of at least 400° C. for at least 1 minute and generally not longer than 20 hours, preferably from about 1 to about 10 hours. While subatmospheric pressure can be employed for the thermal treatment, atmospheric pressure is desired for reasons of convenience, such as in air, nitrogen, ammonia, etc. The thermal treatment can be performed at a temperature up to about 750° C. The thermally treated product is particularly useful in the catalysis of certain hydrocarbon conversion reactions.

The crystalline material described herein, when employed either as a support or a catalyst in an organic compound conversion process may be dehydrated, at least partially. This dehydration can be done by heating to a temperature in the range of 200° C. to 595° C. in an atmosphere such as air, nitrogen, etc. and at atmospheric, subatmospheric or superatmospheric pressures for between 30 minutes and 48 hours. Dehydration can also be performed at room temperature merely by placing the composition in a vacuum, but a longer time is required to obtain a sufficient amount of dehydration.

The reaction mixture for preparing crystalline materials described herein may comprise a source of one or more oxides, a primary organic agent (R') and a solvent or solvent mixture. The solvent or solvent mixture may comprise, for example, $C_1$-$C_6$ alcohols, $C_1$-$C_6$ diols and/or water, especially water. Optional components of the reaction mixture include (1) a source of alkali or alkaline earth metal (M), e.g. sodium or potassium, cations, and (2) an additional organic agent (R"), hereinafter more particular described. Particular sources of oxides include sources of oxides selected from the group consisting of divalent element W, e.g. cobalt; trivalent element X, e.g. aluminum; tetravalent element Y, e.g. silicon; and pentavalent element Z, e.g. phosphorus.

The reaction mixture may have the mole ratio

Solvent/($R'_2O+M_2O$)

of at least 10. When R' is cetyltrimethylammonium and this ratio is 10–45, the formation of the above-mentioned mesoporous phase having the X-ray diffraction pattern of Table 1 is favored. When R' is cetyltrimethylammonium and this ratio is 45–92, the formation of a cubic phase is favored. When R' is cetyltrimethylammonium and this ratio is greater than 92, e.g., 92–300, the formation of a hexagonal phase is favored. It will be understood that mixtures of these phases may be produced near the transition values of these ratios. For example, mixtures of the hexagonal phase and the cubic phase may be produced at ratios of 92-100.

The reaction mixture may have the mole ratio ($R'_2O+R''_2O$)/($YO_2+X_2O_3+Z_2O_5+WO$)

of 0.01–2.0, e.g., 0.03–1.0, e.g., 0.3–1.0, e.g., 0.3–0.6. The pH of the reaction mixture may be from about 7 to 14, e.g., from about 9 to 14.

The components of the reaction mixture may be combined in any order. In some instances, it may be desired to combine the solvent and primary organic agent (R') prior to adding the source of oxide to this preformed mixture. Upon the formation of the reaction mixture, this mixture may, optionally, be subjected to an aging step at low temperature, e.g., from about 0° C. to about 50° C., for a short period of time, e.g., from about 30 minutes to about 2 hours. This aging step may take place in the presence or absence of agitation of the reaction mixture.

Crystallization of the reaction mixture may take place at elevated temperature, e.g., from about 50° C. to about 200° C., e.g., from about 95° C. to about 150° C., for a time sufficient to complete the crystallization. The crystallization may take place under reflux conditions. The crystallization may also take place in the presence of microwave radiation under conditions specified in U.S. Pat. No. 4,778,666.

Batch crystallization of the present crystalline material can be carried out under either static or agitated, e.g. stirred, conditions in a suitable reactor vessel, such as for example, polypropylene jars or teflon lined or stainless steel autoclaves. Crystallization may also be conducted continuously in suitable equipment. The time sufficient for crystallization to occur may be, e.g., from about 5 minutes to about 14 days. Thereafter, the crystals are separated from the liquid and recovered.

When a source of silica is used in the synthesis method, an organic silicate, such as, for example, a quaternary ammonium silicate, may be used, at least as part of this source. Non-limiting examples of such an organic silicate include tetramethylammonium silicate and tetraethylorthosilicate.

The source of silica may also be an aqueous solution of an alkali metal silicate, especially sodium silicate. The reaction mixture may also include a source of alumina such as sodium aluminate, aluminum nitrate or aluminum sulfate.

In addition to the above-mentioned inorganic sources of alumina, organic-containing sources of alumina, such as alkoxides and chelates, may also be used as sources of alumina in the present reaction mixtures.

In addition to employing an organic-containing source of alumina along with a separate source of organic-containing silica in the reaction mixture, sources of alumina and silica may be supplied from a single organic-containing source. Examples of such single organic-containing silica/alumina sources are given in copending U.S. application Ser. No. 07/720,105, filed Jun. 24, 1991, now U.S. Pat. No. 5,110,572, the entire disclosure of which is expressly incorproated herein by reference. These single organic-containing silica/alumina sources may be dialkoxyaluminoxytrialkoxysilanes. An example of such a source is di-s-butoxyaluminoxytriethoxysilane.

By adjusting conditions of the synthesis reaction for each method, like temperature, pH and time of reaction, etc., within the above limits, embodiments of the present material with a desired degree of crystallinity may be prepared.

Non-limiting examples of various combinations of W, X, Y and Z contemplated for the synthesis methods of the present invention include:

| W  | X  | Y  | X |
|----|----|----|---|
| —  | Al | Si | — |
| —  | Al | —  | P |
| —  | Al | Si | P |
| Co | Al | —  | P |
| Co | Al | Si | P |
| —  | —  | Si | — | including the combinations of W being Mg, or an element selected from the divalent first row transition metals, e.g. Mn, Co and Fe; X being B, Ga or Fe; and Y being Ge.

A primary organic agent (R') for use in preparing the present reaction mixture is an ammonium or phosphonium ion of the formula $R_1R_2R_3R_4Q^+$, i.e.:

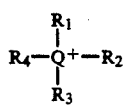

wherein Q is nitrogen or phosphorus and wherein at least one of $R_1$, $R_2$, $R_3$ and $R_4$ is aryl or alkyl of from 6 to about 36 carbon atoms, especially from 8 to 36 carbon atoms, e.g. —$C_{10}H_{21}$, —$C_{16}H_{33}$ and —$C_{18}H_{37}$, or combinations thereof, the remainder of $R_1$, $R_2$, $R_3$ and $R_4$ being selected from the group consisting of hydrogen, alkyl of from 1 to 5 carbon atoms and combinations thereof. The compound from which the above ammonium or phosphonium ion is derived may be, for example, the hydroxide, halide, silicate, or mixtures thereof. This primary organic agent may be an amphiphilic compound which is capable of forming lamellar liquid crystals in aqueous mediums.

An additional organic agent (R'') may also be used. That additional organic agent may be the ammonium or phosphonium ion of the above organic agent formula wherein $R_1$, $R_2$, $R_3$ and $R_4$ together or separately are selected from the group consisting of hydrogen and alkyl of 1 to 5 carbon atoms and combinations thereof. Any such combination of organic agents may be in molar ratio of about 100/1 to about 0.01/1, first above listed organic agent/additional organic agent (R'/R'').

Non-limiting examples of R' capable of forming micelles include cetyltrimethylammonium, cetyltrimethylphosphonium, octadecyltrimethylphosphonium, cetylpyridinium, myristyltrimethylammonium, decyltrimethylammonium, dodecyltrimethylammonium and dimethyldidodecylammonium.

In addition to the above-mentioned primary organic agent (R') and the additional organic agent (R''), the reaction mixture may also contain an auxiliary organic agent (R'''). These auxiliary organic agents are compounds which are capable of swelling micelles. Such auxiliary organic agents may be selected from the group consisting of (1) aromatic hydrocarbons and amines having from 5 to 20 carbon atoms and halogen- and $C_1$–$C_{14}$ alkyl-substituted derivatives thereof, (2) cyclic aliphatic hydrocarbons and amines having from 5 to 20 carbon atoms and halogen- and $C_1$–$C_{14}$ alkyl-substituted derivatives thereof, (3) polycyclic aliphatic hydrocarbons and amines having from 6 to 20 carbon atoms and halogen- and $C_1$–$C_{14}$ alkyl-substituted derivatives thereof, (4) straight and branched aliphatic hydrocarbons and amines having from 3 to 16 carbon atoms and halogen-substituted derivatives thereof, and (5) combinations thereof.

In this group of auxiliary organic agents (R''') for use in the present method, the halogen substituent in substituted derivatives may be, for example, bromine. The $C_{1-14}$ alkyl substituent in the substituted derivatives may be linear or branched aliphatic chains, such as, for example, methyl, ethyl, propyl, isopropyl, butyl, pentyl and combinations thereof. Non-limiting examples of these auxiliary organic agents include, for example, p-xylene, trimethylbenzene, triethylbenzene and triisopropylbenzene. A particular example of such an auxiliary organic agent (R''') is 1,3,5-trimethylbenzene (i.e. mesitylene).

The mole ratio of the auxiliary organic agent to the primary organic agent (R'/R''') may be from about 0.02 to about 100, e.g., from about 0.05 to about 35.

The use of auxiliary organic agents in the preparation of a hexagonal phase material is described in U.S. Pat. No. 5,057,296, the entire disclosure of which is expressly incorporated herein by reference.

It should be realized that the reaction mixture components can be supplied by more than one source. The reaction mixture can be prepared either batchwise or continuously. Crystal size and crystallization time of the new crystalline material will vary with the nature of the reaction mixture employed and the crystallization conditions.

The reaction mixture for preparing the present composition may be free of intentionally added alkali metal ions, especially potassium ions, but this reaction mixture may contain detectable traces of such ions included as impurities in other reactants.

The materials of the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

The present compositions are useful as catalyst components for catalyzing the conversion of organic compounds, e.g. oxygenates and hydrocarbons, by acid-catalyzed reactions. The size of the pores may be such that the spatiospecific selectivity with respect to transition state species is minimized in reactions such as cracking (Chen et al., "Shape Selective Catalysis in Industrial Applications", *Chemical Industries*, 36, pgs. 41–61 (1989) to which reference is made for a discussion of the factors affecting shape selectivity). Diffusional limitations are also minimized as a result of the very large pores in the present materials. For these reasons, the present compositions are especially useful for catalyzing reactions which occur in the presence of acidic sites on the surface of the catalyst and which involve reactants, products or transitional state species which have large molecular sizes, too great for undergoing similar reactions with conventional large pore size solid catalysts, for example, large pore size zeolites such as zeolite X, Y, L, ZSM-4, ZSM-18, and ZSM-20.

Thus, the present catalytic compositions will catalyze reactions such as cracking, and hydrocracking, and other conversion reactions using hydrocarbon feeds of varying molecular sizes, but with particular applicability to feeds with large molecular sizes such as highly aromatic hydrocarbons with substituted or unsubstituted polycyclic aromatic components, bulky naphthenic compounds or highly substituted compounds with bulky steric configurations, e.g. molecular sizes of about 13 Angstroms or more. The present catalytic compositions are particuarly useful for reactions in which the molecular weight of the feed is reduced to a lower value, i.e. to reactions involving cracking such as cracking or hydrocracking. Cracking may be conducted at a temperature of from about 200° C. to about 800° C., a pressure of from about atmospheric to about 100 psig and contact time of from about 0.1 second to about 60 minutes. Hydrocracking may be conducted at a temperature of from about 150° C. to about 550° C., a pressure of from about 100 psig to about 3000 psig, and a weight hourly space velocity of from about 0.1 $hr^{-1}$ to about 100 $hr^{-1}$, with a hydrogen/hydrocarbon molar ratio of from about 0.1 to about 100.

The present catalytic compositions are especially useful for reactions using high molecular weight, high boiling or non-distillable feeds, especially residual feeds, i.e. feeds which are essentially non-distillable or feeds which have an initial boiling point (5% point) above about 1050° F. Residual feeds which may be used with the present catalytic compositions include feeds with API gravities below about 20, usually below 15 and typically from 5 to 10 with Conradsen Carbon Contents (CCR) of at least 1% by weight and more usually at least 5% or more, e.g. 5–10%. In some resid fractions the CCR may be as high as about 20 weight percent or even higher. The aromatic contents of these feeds will be correspondingly high, as may the contents of heteroatoms such as sulfur and nitrogen, as well as metals. Aromatics content of these feeds will usually be at least 50 weight percent and typically much higher, usually at least 70 or 80 weight percent, with the balance being principally naphthenes and heterocyclics. Typical petroleum refinery feeds of this type include atmospheric and vacuum tower resids, asphalts, aromatic extracts from solvent extraction processes, e.g. phenol or furfural extraction, deasphalted oils, slop oils and residual fractions from various processes such as lube production, coking and the like. High boiling fractions with which the present catalytic compositions may be used include gas oils, such as atmospheric gas oils; vacuum gas oils; cycle oils, especially heavy cycle oil; deasphalted oils; solvent extracts, such as bright stock; heavy gas oils, such as coker heavy gas oils; and the like. The present catalytic materials may also be utilized with feeds of non-petroleum origin, for example, synthetic oils produced by coal liquefaction, Fischer-Tropsch waxes and heavy fractions and other similar materials. Another example of a particular feed is shale oil.

As in the case of many catalysts, it may be desired to incorporate the new oxide composition with another material resistant to the temperatures and other conditions employed in organic conversion processes. Such materials include active and inactive materials and synthetic or naturally occurring zeolites as well as inorganic materials such as clays, silica and/or metal oxides such as alumina, titania and/or zirconia. The latter may be either naturally occurring or in the form of gelatinous precipitates or gels including mixtures of silica and metal oxides. Use of a material in conjunction with the new crystal, i.e. combined therewith or present during synthesis of the new crystal, which is active, tends to change the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated with naturally occurring clays, e.g. bentonite and kaolin, to improve the crush strength of the catalyst under commercial operating conditions. Said materials, i.e. clays, oxides, etc., function as binders for the catalyst. It is desirable to provide a catalyst having good crush strength because in commercial use it is desirable to prevent the catalyst from breaking down into powder-like materials. These clay binders have been employed normally only for the purpose of improving the crush strength of the catalyst.

Naturally occurring clays which can be composited with the new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the new crystal can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia.

It may be desirable to provide at least a part of the foregoing matrix materials in colloidal form so as to facilitate extrusion of the bound catalyst components(s).

The relative proportions of finely divided crystalline material and inorganic oxide matrix vary widely, with the crystal content ranging from about 1 to about 90 percent by weight and more usually, particularly when the composite is prepared in the form of beads, in the range of about 2 to about 80 weight percent of the composite.

In order to more fully illustrate the nature of the invention and the manner of practicing same, the following Examples are presented. In the Examples, whenever sorption data are set forth for comparison of sorptive capacities for water, cyclohexane, benzene and/or n-hexane, they are Equilibrium Adsorption values determined as follows:

A weighed sample of the adsorbent, after calcination at about 540° C. for at least about 1 hour and other treatment, if necessary, to remove any pore blocking contaminants, is contacted with the desired pure adsorbate vapor in an adsorption chamber. The increase in weight of the adsorbent is calculated as the adsorption capacity of the sample in terms of grams/100 grams adsorbent based on adsorbent weight after calcination at about 540° C. The present composition may exhibit an equilibrium benzene adsorption capacity at 50 Torr and 25° C. of greater than about 10 grams/100 grams, e.g., greater than about 12.5 g/100 g, e.g., greater than about 15 grams/100 grams, e.g., greater than about 17.5 g/100 g, e.g., greater than about 20 g/100 g, e.g., greater than about 30 g/100 g.

A preferred way to do this is to contact the desired pure adsorbate vapor in an adsorption chamber evacuated to less than 1 mm at conditions of 12 Torr of water vapor, 40 Torr of n-hexane or cyclohexane vapor, or 50 Torr of benzene vapor, at 25° C. The pressure is kept constant (within about ±0.5 mm) by addition of adsorbate vapor controlled by a manostat during the adsorption period. As adsorbate is adsorbed by the new crystal, the decrease in pressure causes the manostat to open a valve which admits more adsorbate vapor to the chamber to restore the above control pressures. Sorption is complete when the pressure change is not sufficient to activate the manostat.

Another way of doing this for benzene adsorption data is on a suitable thermogravimetric analysis system, such as a computer-controlled 990/951 duPont TGA system. The adsorbent sample is dehydrated (physically sorbed water removed) by heating at, for example, about 350° C. or 500° C. to constant weight in flowing helium. If the sample is in as-synthesized form, e.g. containing organic agents, it is calcined at about 540° C. in air and held to constant weight instead of the previously described 350° C. or 500° C. treatment. Benzene adsorption isotherms are measured at 25° C. by blending a benzene saturated helium gas stream with a pure helium gas stream in the proper proportions to obtain the desired benzene partial pressure. The value of the adsorption at 50 Torr of benzene is taken from a plot of the adsorption isotherm.

In the Examples, percentages are by weight unless otherwise indicated.

EXAMPLE 1

Forty grams of tetraethylorthosilicate were combined with 200 grams of ~29% cetyltrimethylammonium hydroxide/chloride solution (prepared by contacting a 29 wt. % N,N,N,-trimethyl-1-hexadecanaminum chloride solution with a hydroxide-for-halide exchange resin with an effective exchange of hydroxide for chloride ion of about 30%) with stirring for one hour in an ice bath (~4° C.). After one hour of stirring 11.5 grams of trimethylbenzene (mesitylene) was added to the mixture with stirring. This mixture was placed into a polypropylene bottle and put into a steam box (~100° C.) for 48 hours. The product was filtered, washed, and air-dried. The XRD pattern of the as-synthesized material shows that the d-spacings of the major peaks are approximately 37 and 18.5 Angstroms. The product was then calcined at 540° C. (one hour in nitrogen followed by six hours in air). The calcined material was thermally unstable as shown by the lack of peaks in the XRD pattern.

EXAMPLE 2

One gram of the as-synthesized material of Example 1 was mixed with one gram of tetraethylorthosilicate and allowed to mix at room temperature for overnight. Five grams of deionized (DI) water were added to the mixture and allowed to react for one hour at room temperature. The solid product was filtered and dried in air at ambient temperature. The solid was calcined in $N_2$ for two hours at 538° C. followed by two hours in air at 538° C. The calcined material sorbed 375 mg/g benzene at 40° C. and exhibited an X-ray diffraction pattern with an intense line at 39.7 Angstroms and a weaker line at 20.0 Angstroms. A pore size of 26 Angstroms (width at half height=5 Angstroms) and pore volume of 0.52 cc/g were determined by Argon physisorption.

EXAMPLE 3

One gram of the as-synthesized crystalline material of Example 1 was mixed with one gram aluminum tri-sec-butoxide for overnight at room temperature. Five grams of deionized $H_2O$ were added to the mixture and mixed at room temperature for one hour. The resulting solid was recovered by filtration and dried in air at ambient temperature. The sample was calcined in $N_2$ at 538° C. for one hour followed by six hours in air. The calcined product sorbed 275 mg/g benzene at 30° C. and 55 torr benzene pressure.

EXAMPLE 4

Four hundred grams of cetyltrimethylammonium (CTMA) hydroxide/chloride solution, prepared by contacting a 29 wt. % N,N,N-trimethyl-1-hexadecanaminum chloride solution with a hydroxide-for-halide exchange resin with an effective exchange of hydroxide for chloride ion of about 30%, was combined with 4 grams of Catapal alumina, 200 grams of tetramethylammonium silicate solution (10 wt. % $SiO_2$) and fifty grams of HiSil with stirring. This mixture was placed in a stirred autoclave and heated to 150° C. for 48 hours. The mixture had a composition in terms of moles per mole $Al_2O_3$:

| | |
|---|---|
| 0.23 | moles of $Na_2O$ |
| 27.8 | moles of $SiO_2$ |
| 5.1 | moles of $(CTMA)_2O$ |
| 4.4 | moles of $(TMA)_2O$ |
| 650 | moles of $H_2O$ |

The resultant product was filtered, washed, air-dried. The X-ray diffraction pattern of the as-synthesized product of this Example may be characterized as including a very strong relative intensity line at 35.0±2 Angstroms d-spacing and a weak line at 17.6±1 Angstrom. The product was then calcined at 540° C. for one hour in nitrogen followed by six hours in air. The X-ray diffraction pattern of the calcined material was featureless indicating that the material was thermally unstable.

EXAMPLE 5

One gram of the as-synthesized crystalline material of Example 4 was mixed with one gram tetraethylorthosilicate for overnight at room temperature. Five grams of deionized $H_2O$ were added to the mixture and mixed at room temperature for one hour. The resulting solid was recovered by filtration and dried in air at ambient temperature. The sample was calcined in $N_2$ at 538° C. for one hour followed by six hours in air. The Scintag XRD pattern showed a very strong intense line at 34.7±2 Angstroms and a weak line at 17.3±2 Angstroms. A pore volume of 0.65 cc/g and a pore size of 29 Angstroms (width at half height=7 Angstroms) were determined by Argon physisorption.

EXAMPLE 6

One hundred grams of cetyltrimethylammonium (CTMA) hydroxide/chloride solution, prepared by contacting a 29 wt. % N,N,N-trimethyl-1-hexadecanaminum chloride solution with a hydroxide-for-halide exchange resin with an effective exchange of hydroxide for chloride ion of about 30%, was combined with 13.75 grams of titanium ethoxide with stirring for one hour. This mixture was placed in a polypropylene bottle and put into a steam box (~100° C.) for 48 hours. The mixture had a composition in terms of moles per mole $TiO_2$ assuming complete exchange of the surfactant:

| | |
|---|---|
| 0.80 | moles of $(CTMA)_2O$ |
| 66 | moles of $H_2O$ |

The resultant product was filtered, washed, air-dried. The X-ray diffraction pattern of the as-synthesized product of this Example may be characterized as including a very strong relative intensity line at 33.0±2 Angstroms d-spacing and weak lines at 17.3±1 Angstrom, 11.6±1 Angstrom, and 8.8±1 Angstrom. The product was then calcined at 540° C. for one hour in nitrogen followed by six hours in air. The X-ray diffraction pattern of the calcined material was featureless indicating that the material was thermally unstable.

EXAMPLE 7

One gram of the as-synthesized crystalline material of Example 6 was mixed with one gram tetraethylorthosilicate for overnight at room temperature. Five grams of deionized $H_2O$ were added to the mixture and mixed at room temperature for one hour. The resulting solid was recovered by filtration and dried in air at ambient temperature. The same was calcined in $N_2$ at 538° C. for one hour followed by six hours in air. Following calcination, this material sorbed 275 mg/g benzene at 30° C.

EXAMPLE 8

To a solution of 4.9 g of $NaAlO_2$ (43.5% $Al_2O_3$, 30% $Na_2O$) in 37.5 g of water were added 46.3 cc of 40% tetraethylammonium hydroxide (TEA-OH) and 96 g of Ludox AS40 giving a mixture of the following composition:

| $Na_2O$: | $Al_2O_3$: | $SiO_2$: | $(TEA)_2O$: | $H_2O$ |
|---|---|---|---|---|
| 0.9 | 1 | 27.1 | 2.8 | 166 |

The mixture was loaded into a 300 cc autoclave and reacted at 150° C. with stirring (200 RPM) for 20 hrs. The slurry was combined with equal amount of the 29% solution of CTMA hydroxide/chloride (referred to in Example 1) and reacted at 150° C. at 72 hours. Following filtration the solid was washed, dried at 100° C. and reacted with tetraethylorthosilicate (TEOS) (24 hrs at 80° C.). Subsequent hydrolysis with water and calcination at 450° C. for 10 hrs afforded product with low angle peaks at 35.3 and 17.6 Angstroms d-spacing.

What is claimed is:

1. A composition of matter comprising an inorganic, porous material exhibiting, after calcination, an X-ray diffraction pattern according to Table 1 with no peaks at positions less than about 10 Angstroms d-spacing with relative intensity greater than 20% of the strongest peak.

2. A composition of matter according to claim 1 which is an oxide material.

3. A composition of matter according to claim 1 having a composition expressed as follows:

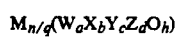

$M_{n/q}(W_a X_b Y_c Z_d O_h)$ wherein M is one or more ions; n is the charge of the composition excluding M expressed as oxides; q is the weighted molar average valence of M; n/q is the number of moles or mole fraction of M; W is one or more divalent elements; X is one or more trivalent elements; Y is one or more tetravalent elements; Z is one or more pentavalent elements; a, b, c, and d are mole fractions of W, X, Y, and Z, respectively; h is a number of from 1 to 2.5; and (a+b+c+d)=1.

4. A composition of matter according to claim 3, wherein the sum (a+b+c) is greater than d, and h=2.

5. A composition of matter according to claim 3, wherein W is a divalent first row transition metal or magnesium; X is an element selected from the group consisting of aluminum, boron, gallium and iron; Y is an element selected from the group consisting of silicon, titanium and germanium; and Z is phosphorus.

6. A composition of matter according to claim 1 having a benzene adsorption capacity of greater than 15 grams of benzene per 100 grams of said composition at 6.7 kPa and 25° C.

7. A composition of matter according to claim 1 which is composed of silica.

8. A composition of matter according to claim 2, having an X-ray diffraction pattern with 3 or more peaks and having the values shown in Table 2.

9. A composition of matter according to claim 2, having an X-ray diffraction pattern with 4 or more peaks and having the values shown in Table 3.

10. A composition of matter according to claim 1, wherein said X-ray diffraction pattern has no peaks at positions less than about 10 Angstroms d-spacing with relative intensity greater than 10% of the strongest peak.

11. A composition of matter according to claim 3, wherein said composition of matter is prepared by a process comprising the steps of:
 (a) preparing a reaction mixture having a composition in terms of mole ratios, within the following ranges:

| | | |
|---|---|---|
| $X_2O_3/YO_2$ | = | 0 to 0.5 |
| $X_2O_3/(YO_2 + Z_2O_5)$ | = | 0.1 to 100 |
| $X_2O_3/(YO_2 + WO + Z_2O_5)$ | = | 0.1 to 100 |
| $R'_2O/(X_2O_3 + YO_2 + WO + Z_2O_5)$ | = | 0.3 to 2.0 |
| Solvent/$(X_2O_3 + YO_2 + WO + Z_2O_5)$ | = | 1 to 1500 | wherein R comprises an organic agent having the formula $R_1R_2R_3R_4Q^+$, wherein Q is nitrogen or phosphorus, and at least one of $R_1$, $R_2$, $R_3$, $R_4$ is aryl or alkyl group having 6 to 36 carbon atoms and each of the remainder of $R_1$, $R_2$, $R_3$, and $R_4$ is selected from hydrogen and an alkyl group having 1 to 5 carbon atoms and wherein the solvent is a $C_1$ to $C_6$ alcohol or diol, or water;

(b) maintaining said mixture under sufficient conditions of pH, temperature and time for formation of an inorganic oxide containing residual organic compound;

(c) recovering said inorganic oxide containing residual organic compound from step (b);

(d) treating said inorganic oxide of step (c) with a compound of the formula $$M'X'_2Y'_m$$

where M' is boron, aluminum, silicon or titanium; X' represents alkyl halides having from 1-6 carbon atoms and/or alkoxides having 1-6 carbon atoms; Y' represents X' and/or alkyls with 1-12 carbon atoms; and m=1-2; and (e) calcining said material from step (d) under conditions sufficient to remove residual organic compounds.

12. A composition of matter according to claim 11, wherein said reaction mixture of step (a) comprises tetraethylammonium ions.

13. A composition of matter according to claim 11, wherein the source of oxide in step (a) is titanium ethoxide.

14. A composition of matter according to claim 1, exhibiting a benzene adsorption capacity of greater than about 15 grams benzene per 100 grams anhydrous crystal at 50 torr and 25° F.

15. A composition of matter according to claim 11, wherein $M'X'_2Y'_m$ is tetraethylorthosilicate.

16. A composition of matter according to claim 11, wherein $M'X'_2Y'_m$ is an aluminum tri-butoxide.

* * * * *